(12) United States Patent
Nemoto

(10) Patent No.: US 6,690,983 B2
(45) Date of Patent: Feb. 10, 2004

(54) NUMERICAL CONTROL DATA CREATING DEVICE AND NUMERICAL CONTROL DATA CREATING METHOD

(75) Inventor: Kyoichi Nemoto, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/255,333

(22) Filed: Sep. 26, 2002

(65) Prior Publication Data

US 2003/0028280 A1 Feb. 6, 2003

Related U.S. Application Data

(63) Continuation of application No. 09/570,450, filed on May 12, 2000, now Pat. No. 6,480,754.

(30) Foreign Application Priority Data

May 18, 1999 (JP) .......................................... P11-137452

(51) Int. Cl.[7] .............................................. G06F 19/00
(52) U.S. Cl. ........................ 700/100; 700/181; 29/740
(58) Field of Search ................................ 700/100, 251, 700/253, 181, 278; 29/836, 834

(56) References Cited

U.S. PATENT DOCUMENTS 5,237,508 A * 8/1993 Furukawa et al. .......... 700/100
5,329,690 A * 7/1994 Tsuji et al. ................... 29/701
6,161,277 A * 12/2000 Asai et al. .................... 29/740

* cited by examiner

Primary Examiner—Leo Picard
Assistant Examiner—Kidest Bahta
(74) Attorney, Agent, or Firm—Sonnenschein, Nath & Rosenthal LLP

(57) ABSTRACT

In NC data creating device and method, a data input portion separates part data of a part to be mounted and mount coordinate data indicating the mount position of the part from design information of a board input and stores the production time of the board input, a feeding means characteristic management portion creates and manages feeding means characteristic data indicating the relationship between the part and the part feeding means on the basis of the part data, a recognizing method management portion creates and manages recognizing method data indicating the relationship between the part and a method of recognizing the part on the basis of the part data, a mount time management portion creates and manages the mount time data indicating the mount time required for mounting onto the board every part type on the basis of the part data, and numerical control data creating means creates numerical control data on the basis of the data of each storage portion and each management portion.

2 Claims, 6 Drawing Sheets

FIG. 6

| PART ID | PART TYPE ID | PART NAME |
|---|---|---|
| 1 | 1 | 1005R |
| 2 | 2 | 0603C |
| 3 | 1 | 1005R |
| ⋮ | ⋮ | ⋮ |
| n | n | 1608C |

PART DATA (PART DATA STORAGE PORTION 14)

FIG. 7

| PART ID | PART TYPE ID | X-COORDINATE | Y-COORDINATE |
|---|---|---|---|
| 1 | 1 | 0.0 | 10.0 |
| 2 | 2 | 10.0 | 5.0 |
| 3 | 1 | -20.0 | 50.0 |
| ⋮ | ⋮ | ⋮ | ⋮ |
| n | n | 50.0 | 99.9 |

MOUNT COORDINATE DATA (COORDINATE DATA STORAGE PORTION 12)

FIG. 8

| ID | PART TYPE ID | NOZZLE TYPE ID |
|---|---|---|
| 1 | 1 | S |
| 2 | 2 | A |
| 3 | 3 | S |
| ⋮ | ⋮ | ⋮ |
| n | n | D |

NOZZLE CHARACTERISTIC DATA
(NOZZLE CHARACTERISTIC MANAGEMENT PORTION 15)

FIG. 9

| ID | PART TYPE ID | RECOGNIZING METHOD ID |
|---|---|---|
| 1 | 1 | LED |
| 2 | 2 | SMALL |
| 3 | 3 | LARGE |
| ⋮ | ⋮ | ⋮ |
| n | n | MIDDLE |

RECOGNIZING METHOD DATA
(RECOGNIZING METHOD MANAGEMENT PORTION 16)

FIG. 10

| NOZZLE TYPE ID | RECOGNIZING METHOD ID | PART TYPE ID | MOUNT TARGET NUMBER | PART ID |
|---|---|---|---|---|
| S | LED | 2 | 100 | 1, 2, 3, 4, 5, 6, 7, ···, 100 |
|   |   | 3 | 50 | 101, 102, 103, ···, 150 |
| A | SMALL | 10 | 3 | 151, 152, 153 |
| B | LARGE | 20 | 2 | 154, 155 |
|   |   |   |   |   |
|   |   |   |   |   |

MOUNTING MACHINE TYPE DATA (MOUNTING MACHINE TYPE DATA STORAGE PORTION 40)

FIG. 11

| ID | PART TYPE ID | MOUNT TIME (MSEC.) |
|---|---|---|
| 1 | 1 | 100 |
| 2 | 2 | 200 |
| 3 | 3 | 123 |
| ⋮ | ⋮ | ⋮ |
| n | n | 435 |

MOUNT TIME DATA (MOUNT TIME MANAGEMENT PORTION 22)

FIG. 12

| NOZZLE TYPE ID | RECOGNIZING METHOD ID | MOUNTING MACHINE ID | PART TYPE ID | MOUNT TARGET NUMBER | MOUNT TIME | PART ID |
|---|---|---|---|---|---|---|
| S | LED | 1 | 2 | 50 | 50 | 1, 2, ··· |
|   |   | 2 | 2 | 50 | 50 | 51, 52, ··· |
|   |   | 3 | 3 | 50 | 50 | 101, ··· |
| A | SMALL | 4 | 10 | 3 | 12 | 151, ··· |
|   |   |   |   |   |   |   |
|   |   |   |   |   |   |   |

MOUNTING MACHINE CONSTRUCTION DATA
(MOUNTING MACHINE CONSTRUCTION DATA STORAGE PORTION 45)

NUMERICAL CONTROL DATA CREATING DEVICE AND NUMERICAL CONTROL DATA CREATING METHOD

RELATED APPLICATION DATA

The present application claims priority to Japanese Application No. P11-137452, filed May 18, 1999, and is a continuation of U.S. application Ser. No. 09/570,450, filed May 12, 2000, both of which are incorporated herein by reference to the extent permitted by law.

BACKGROUND OF THE INVENTION

1. Field of the Invention

The present invention relates to a numerical control data creating device and a numerical control data creating method for creating numerical control data to control a part mounting machine for feeding a part and mounting the part on a board, and particularly to numerical control data creating device and method which are suitable for constructing numerical control data for a numerical control device for controlling the driving of an electrical part mounting machine and a mounting line.

2. Description of the Prior Art

In an electrical part mounting machine (hereinafter referred to as a part mounting machine), the mounting operation of an electrical part onto a wiring board is controlled by an NC device which operates according to an NC program created in advance by a numerical control (hereinafter referred to as NC) data creating device.

Therefore, when plural electrical parts are mounted on a wiring board by using plural part mounting machines, NC programs are created for respective part mounting machines in consideration of which part mounting machines should be combined and used as a mounting line.

In the conventional NC data creating device, the mount position of an electrical part is indicated from CAD (Computer Aided Design) data when a wiring board is designed, NC data comprising information indicating which part supply cassette of a part mounting machine the electrical part should be supplied to, information indicating the absorbing order of attaching the electrical part thus supplied to the nozzle of the part mounting machine under suction, and information indicating the order of mounting the electrical part thus attached onto a wiring board, and an NC program is created on the basis of these NC data.

Further, a part table, etc. are created from the CAD data, the types and number of electrical parts of the whole system are grasped, and it is considered by a worker which electrical part should be allocated to each part supply cassette and which part mounting machine should be used for mounting from a desired nozzle, thereby separately considering the types, number, arrangement, etc. of part mounting machines constituting a mounting line.

However, if NC data as described above are created every time an electrical part is mounted on each wiring board, there is a disadvantage that it takes very long time to obtain NC data for part mounting. Further, if the NC data for mounting are created on the basis of only wiring board design data, there is a disadvantage that an improvement to operate a part mounting machine efficiently is dependent on the experience of the creator thereof, and thus the operation rate of the part mounting machine may be lowered. Still further, even when the types, number and arrangement of part mounting machines constituting a mount line are determined on the basis of production number, part type number, part number, etc. of a wiring board, it is dependent on the experience of the worker. Therefore, there is a disadvantage that dispersion occurs in production cost and quality.

SUMMARY OF THE INVENTION

The present invention has been implemented from the foregoing situation, and has an object to provide an NC data creating device and an NC data creating method which can shorten the creating time of the NC data of the part mounting machine, enhance the quality of NC data, and enhance the operation rate of the part mounting machine.

In order to attain the above object, according to a first aspect of the present invention, there is provided a numerical control data creating device for creating numerical control data to control a part mounting machine for feeding a part and mounting the part on a board, characterized by comprising: data input portion for separating part data of the part to be mounted on the basis of design information of the board input and mount coordinate data indicating the mount position of the part and storing a producing time of the board input; a part data storage portion for storing the part data; a coordinate data storage portion for storing the mount coordinate data; a feeding means characteristic management portion for creating and managing feeding means characteristic data indicating the relationship between the part and the part feeding means on the basis of the part data; a recognizing method managing portion for creating and managing recognizing method data indicating the relationship between the part and a method for recognizing the part on the basis of the part data; a mount time managing portion for creating and managing mount time data indicating a mount time required for the mounting on the board every type of the part on the basis of the part data; and numerical control data creating means for creating the numerical control data on the basis of the data owned by each storage portion and each management portion.

In order to attain the above object, according to a second aspect of the present invention, there is provided a numerical control data creating method for creating numerical control data to control a part mounting machine for feeding a part and mounting the part onto a board, characterized by comprising: a step of separating part data of the part to be actually mounted from design information of the board, and mount coordinate data indicating the mount position of the part; a step of creating, on the basis of the part data, feeding means characteristic data indicating the relationship between the part and part feeding means, recognizing method data indicating the relationship between the part and a method for recognizing the part, and mount time data indicating the mount time required for the mounting onto the board every part type; and a step of creating numerical control data on the basis of the respective data.

According to the present invention, the numerical control data are created on the basis of data on a part, a mounting machine, etc., and thus the data are suitable for the construction of the part mounting machine. Further, the contents of data on a part, a mounting machine, etc. contain no experience of a creator, so that the content of the numerical control data is uniform, not dependent on the creator. Therefore, the mounting work time of each part mounting machine is uniform and the operation rate of the part mounting machine is enhanced.

BRIEF DESCRIPTION OF THE DRAWINGS

FIG. 6 is a first diagram showing a data example of the NC data creating device shown in FIG. 4;

FIG. 7 is a second diagram showing a data example of the NC data creating device shown in FIG. 4;

FIG. 8 is a third diagram showing a data example of the NC data creating device shown in FIG. 4;

FIG. 9 is a fourth diagram showing a data example of the NC data creating device shown in FIG. 4;

FIG. 10 is a fifth diagram showing a data example of the NC data creating device shown in FIG. 4;

FIG. 11 is a sixth diagram showing a data example of the NC data creating device shown in FIG. 4;

FIG. 12 is a seventh diagram showing a data example of the NC data creating device shown in FIG. 4;

DETAILED DESCRIPTION OF THE PREFERRED EMBODIMENTS

Preferred embodiments of the present invention will be described in detail with reference to the accompanying drawings.

The following embodiments are preferable embodiments of the present invention, and thus various technically preferable limitations are imposed on hem. However, in the following description, the scope of the present invention is not limited to these embodiments unless the limitations of the present invention are especially described.

Figure 1:
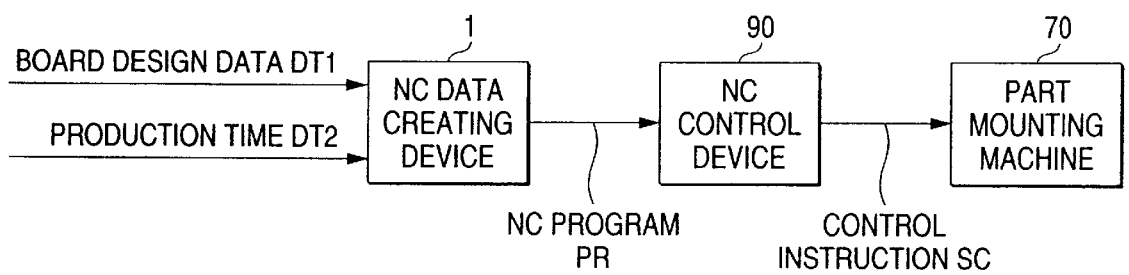
FIG. 1 is a schematic diagram showing an electrical part mounting system containing an embodiment of an NC data creating device of the present invention.

FIG. 1 is a schematic diagram showing a mounting system of electrical parts which contains an embodiment of an NC data creating device according to the present invention.

In FIG. 1, the mounting system comprises an NC data creating device 1, an NC device 90 and a part mounting machine 70. Design data DT1 of a wiring board and a production time DT2 of the wiring board are input to the NC data creating device 1, and an NC program PR for controlling the driving of the part mounting machine 70 is created on these data DT1, DT2 and down-loaded to the NC device 90. The NC device 90 decodes the NC program PR from the NC data creating device 1, and outputs a control instruction SC for controlling the driving of various types of actuators owned by a part mounting machine 70. The part mounting machine 70 mounts various electrical parts supplied onto the wiring board on the basis of the control instruction SC from the NC device 90.

Figure 2:
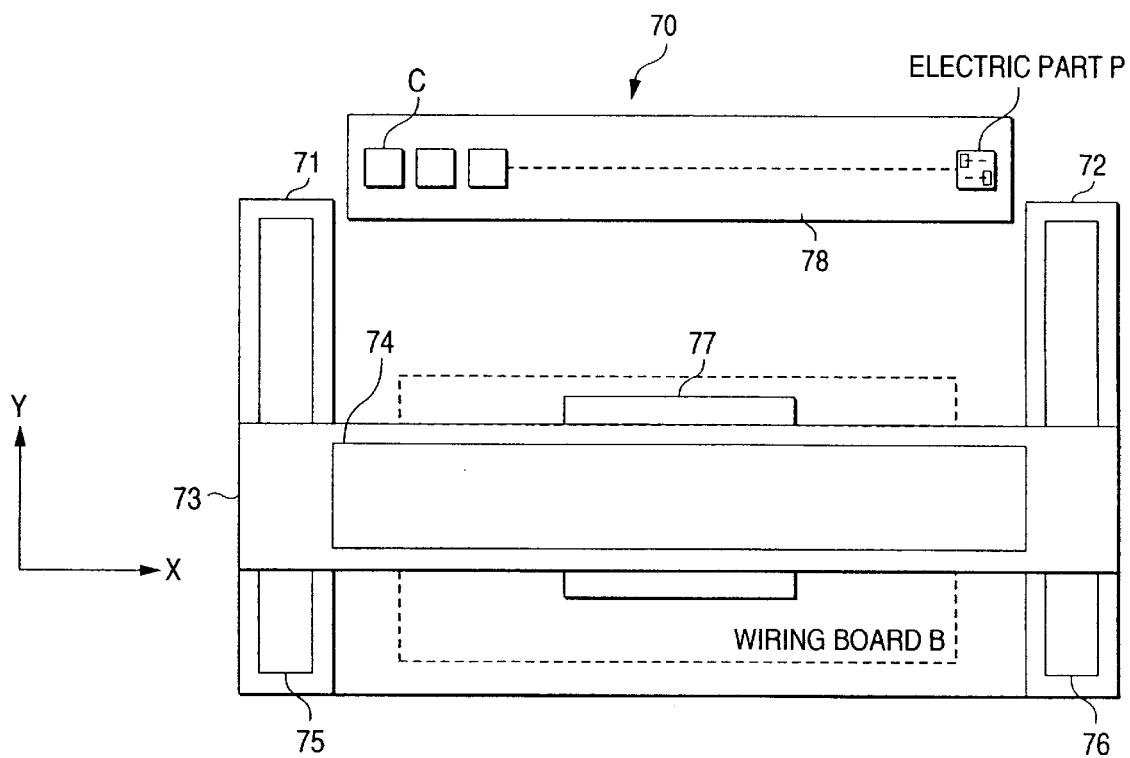
FIG. 2 is a plan view showing the construction of the part mounting machine shown in FIG. 1.

FIG. 2 is a plan view showing the construction of the part mounting machine 70 shown in FIG. 1.

In FIG. 2, the part mounting machine 70 is designed so that a beam 73 is bridged between columns 71, 72 erected at both sides thereof. An X-axial guide 74 is provided at the lower side of the beam 73, and two Y-axial guides 75, 76 are provided at the upper sides of the two columns 71, 72. A head portion 77 is provided at the lower side of the X-axial guide 74.

The beam 73 is movable in the Y-axial direction along the Y-axial guides 75, 76 by a ball screw (not shown) provided in the Y-axial direction and a servo motor for driving the ball screw, and the head portion (feeding means) 77 is movable in the X-axial direction along the X-axial guide 74 by a ball screw (not show) provided in the X-axial direction and a servo motor for driving the ball screw, whereby the head portion 77 is movable to any position on the XY plane.

Figure 3A:
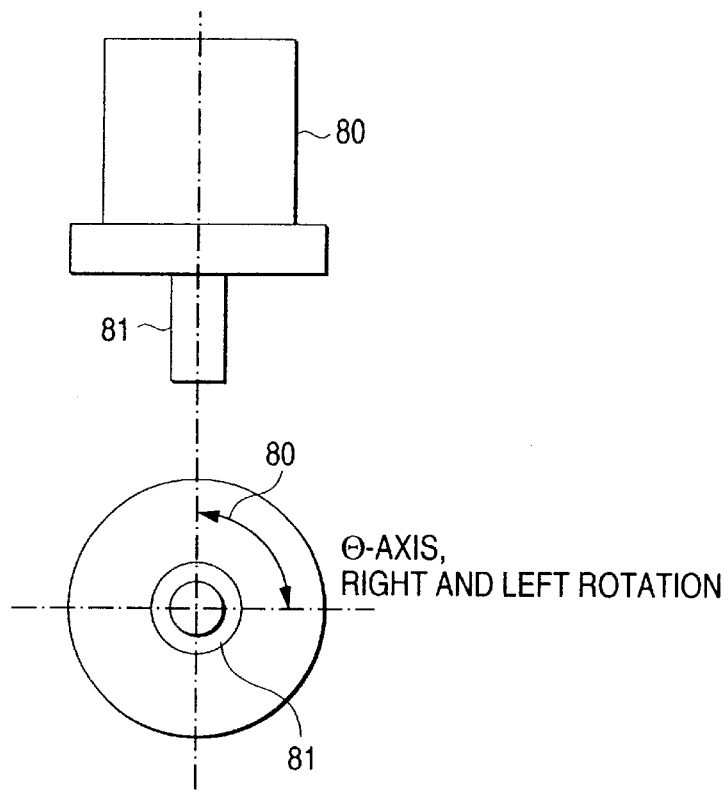
FIGS. 3A and 3B are diagrams showing a nozzle head and a part suction nozzle of the part mounting machine shown in FIG. 1.

A nozzle head (feeding means) 80 and a part suction nozzle (feeding means) 81 as shown in FIG. 3A are mounted at the lower side of the head portion 77. In the nozzle head 80, each kind of part suction nozzle 81 is freely detachably mounted, and it is rotatable at any angle by a driving source (not shown).

A part supplier 78 is disposed between the Y-axial guides 75, 76 of the part mounting machine 70. Plural (10 in this embodiment) cassettes C are arranged at the part supplier 78, and plural electrical parts P are supplied through these cassettes C.

The mounting of the part suction nozzle 81 onto the nozzle head 80 and the arrangement of the cassettes C on the part supplier 78 are automatically performed by a nozzle automatic exchange device and a cassette feeder (tray feeder) (not shown) or the like, and the control of these is carried out by the NC device 90.

Figure 3B:
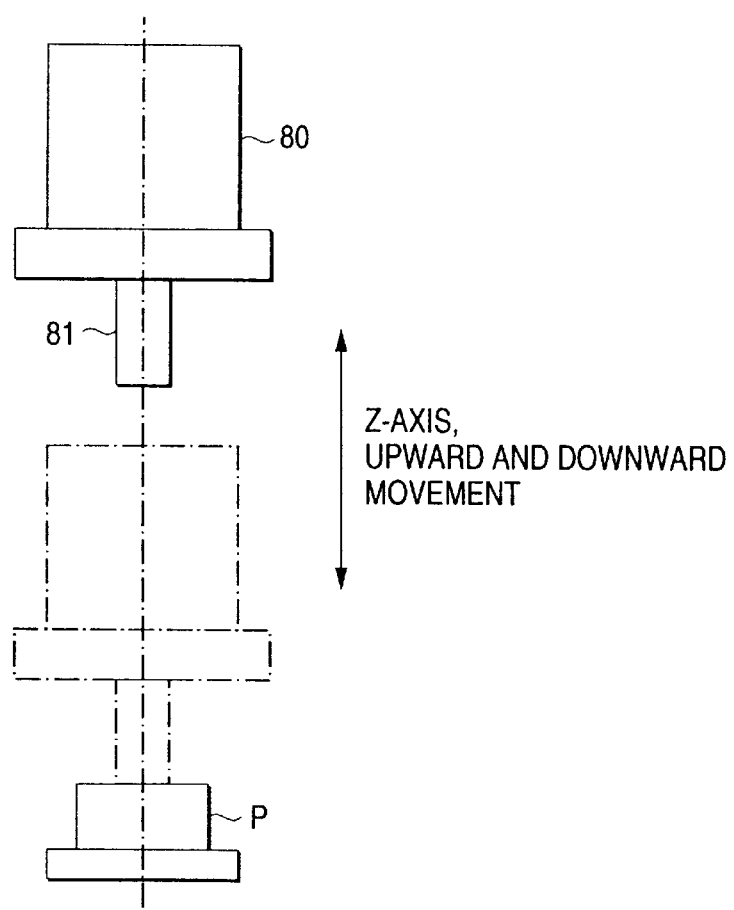

The mounting operation of an electrical part P will be briefly described in the above construction. First, the head portion 77 is moved to the upper side of the electrical part P in a desired cassette C disposed on the part supplier 78. As shown in FIG. 3B, the part suction nozzle 81 descends in the Z-axial direction together with the nozzle head 80, and sucks a desired electrical part P. Subsequently, the header 77 is moved to the upper side of a desired position of a wiring board B. The part suction nozzle 81 descends in the Z-axial direction together with the nozzle head 80, and mounts the sucked electrical part P at a desired position of the wiring board B.

The NC device 90 shown in FIG. 1 is a well-known NC device for performing the position control and the speed control for an actuator for driving the head portion 77 on the basis of the NC program created in the NC data creating device 1, and also performing the rotation control of the nozzle head 80 and the driving control thereof in the Z-axial direction, and the specific description thereof is omitted. The transmission of the NC program from the NC data creating device 1 to the NC device 90 is carried out through a desired storage medium or communication means.

Figure 4:
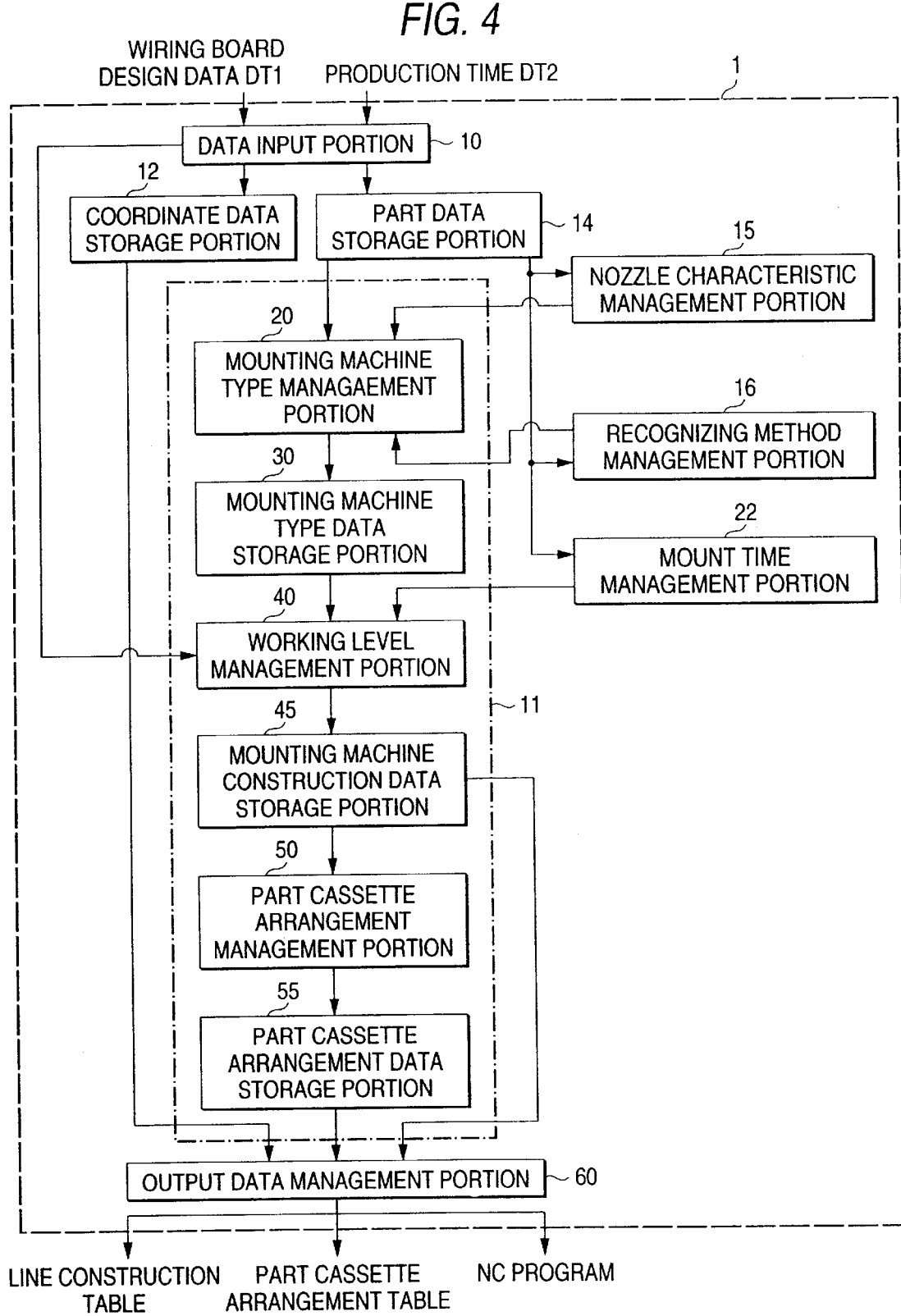
FIG. 4 is a block diagram showing the construction of the NC data creating device shown in FIG. 1.

FIG. 4 is a block diagram showing the construction of the NC data creating device 1 shown in FIG. 1.

In FIG. 4, the NC data creating device 1 has a data input portion 10, a part data storage portion 14, a coordinate data storage portion 12, a nozzle characteristic management portion (feeding means characteristic management portion) 15, a recognizing method management portion 16, a mount time management portion 22, an NC data creating means 11, and an output data management portion 60. The NC data creating means 11 has a mounting machine type management portion 20, a mounting machine type data storage portion 30, a working level management portion 40, a mounting machine construction data storage portion 45, a part cassette arrangement management portion 50, and a part cassette arrangement data storage portion 55. Each portion of the NC data creating device 1 can be implemented by a personal computer and software.

The data input portion 10 separates the part data of the electrical part P to be mounted on the wiring board B and mount coordinate data indicating the mount position of the electrical part P from the wiring board design data DT1 input as CAD data, stores the part data into the part data storage portion 14 and stores the mount coordinate data into the coordinate data storage portion 12. Further, the data input portion 10 also has a function of storing the production time DT2 of the wiring board B input.

The part data stored in the part data storage portion 14 comprise the combination of an inherent part ID provided every electrical part P, a part type ID for specifying the type of the electrical part P and the part name of the electrical part P. The mount coordinate data to be stored in the coordinate data storage portion 12 comprise the combination of the part ID, the part type ID and a mount coordinate value (X-coordinate, Y-coordinate) of the electrical part P on the wiring board B.

The nozzle characteristic management portion 15 combines the part type ID stored in the part data storage portion 14, and a nozzle type ID indicating the type of the part suction nozzle 81 for sucking the electrical part P corresponding to the part type ID to create and manage the nozzle characteristic data. The recognizing method management portion 16 combines the part type ID stored in the part data storage portion 14 and a recognizing method ID indicating a method for recognizing the electrical part P corresponding to the part type ID to create and manage the recognizing method data.

The mounting machine type management portion 20 associates the nozzle type ID managed in the nozzle characteristic management portion 15 with the recognizing method ID managed by the recognizing method management portion 16 on the basis of the part type ID stored in the part data storage portion 14, and further associates the number of mount targets every part type ID with the part ID to create the mounting machine type data and store it into the mounting machine type data storage portion 30.

The mount time management portion 22 combines the part type ID stored in the part data storage portion 14 and the mount time of the electrical part P corresponding to the part type ID to create and manage the mount time data.

The working level management portion 40 associates the mount time of each part type ID managed by the mount time management portion 22 with the mounting machine type data stored in the mounting machine type storage portion 30, further with the mounting machine ID to create the mounting machine construction data and store it into the mounting machine construction data storage portion 45.

The part cassette arrangement management portion 50 determines the part cassette C arranged on the part supplier 78 every part mounting machine on the basis of the mounting machine construction data stored in the mounting machine construction data storage portion 45, creates the part cassette arrangement data and stores it into the part cassette arrangement data storage portion 55.

The output data management portion 60 creates and outputs a line construction table on the basis of the mounting machine construction data stored in the mounting machine construction data storage portion 45, and creates and outputs a cassette arrangement table on the basis of the part cassette arrangement data stored in the part cassette arrangement data storage portion 55. Further, it creates and outputs the NC program for the NC device 90 on the basis of the NC data comprising the mount coordinate data stored in the coordinate data storage portion 12, the part cassette arrangement data stored in the part cassette arrangement data storage portion 55 and the mounting machine construction data stored in the mounting machine construction data storage portion 45.

Figure 5:
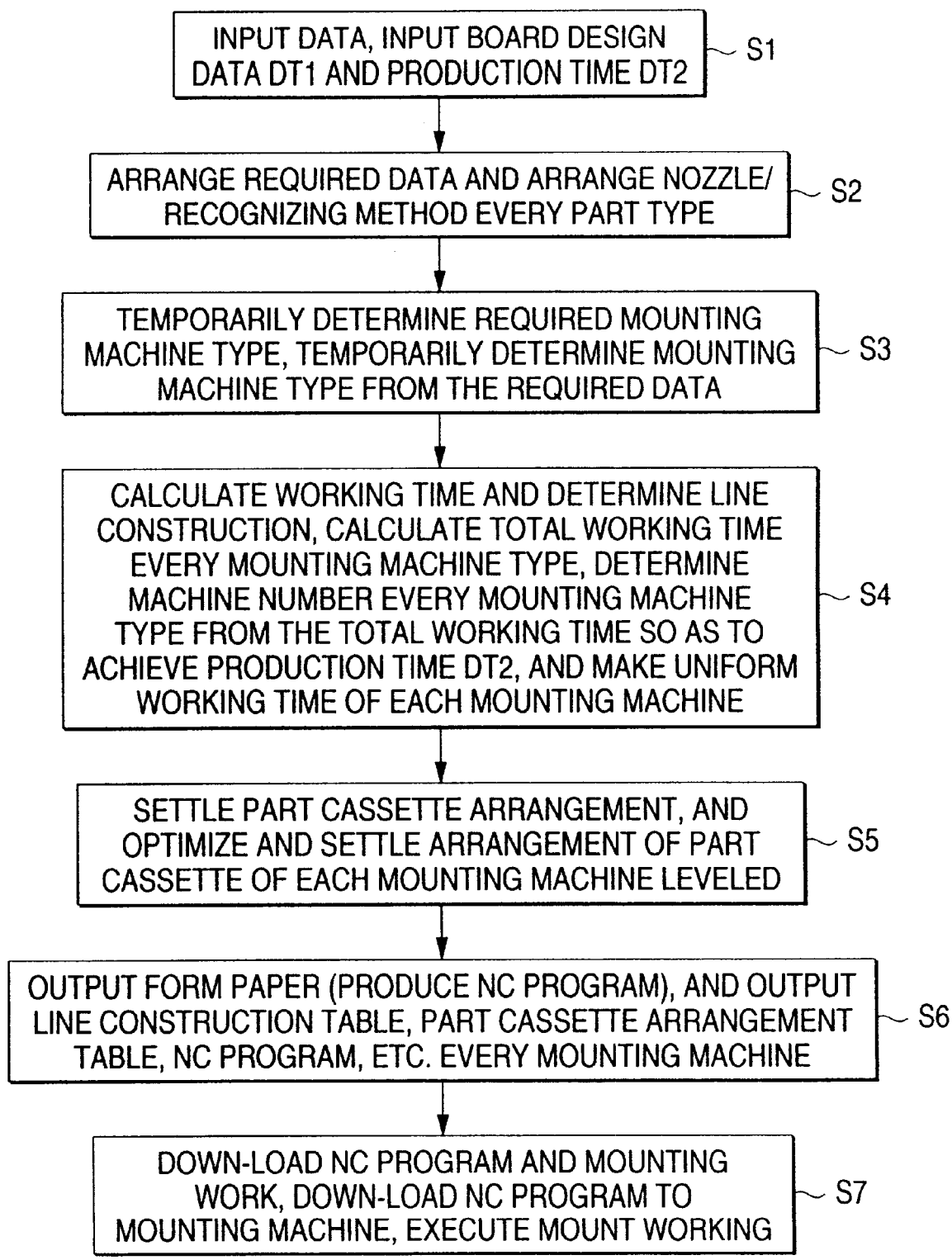
FIG. 5 is a flowchart showing an operation of the NC data creating device shown in FIG. 4.

The operation of the electrical part mounting system containing the NC data creating device 1 thus constructed will be described with reference to a flowchart shown in FIG. 5.

In the NC data creating device 1, the data input portion 10 first inputs each data required to create NC data (step Si). Specifically, the data input portion 10 inputs the wiring board design data DT1 and the production time DT2 created as CAD data. The data input portion 10 separates the part data shown in FIG. 6 and the mount coordinate data shown in FIG. 7 from the wiring board design data DT1. Here, when the NC data creating device 1 is constructed by a personal computer and a CAD soft is installed in the computer, the CAD data can be easily input.

Subsequently, the mounting machine type management portion 20 arranges the type of the nozzle and the recognizing method every type of the electric part P (step S2). Specifically, the mounting machine type management portion 20 is managed by the nozzle characteristic management portion 15. For example, the part type ID and the nozzle type ID are associated with each other on the basis of the nozzle characteristic data shown in FIG. 8 and the part data stored in the part data storage portion 14. Further, it is managed by the recognizing method management portion 16. For example, the part type ID and the recognizing method ID are associated with each other on the basis of the recognizing method data shown in FIG. 9 and the part data stored in the part data storage portion 14.

Subsequently, the mounting machine type management portion 20 temporarily determines the type of a required part mounting machine (step S3). Specifically, the mounting machine type management portion 20 pairs the same nozzle type ID and recognizing method ID from the table associated along the processing procedure of step S2, and creates mounting machine type data in which the part type ID, the mount target number and the part ID are sectioned from one another as shown in FIG. 10, whereby the mounting machine type for mounting the electrical part P of the wiring board design data DT1 (the combination of the nozzle type and the recognizing method) can be temporarily determined.

Subsequently, the working level management portion 40 calculates the working time, and settles the number of part mounting machines (step S4). Specifically, the working level management portion 40 calculates the total working time (total mount time) every combination (mounting machine type) of the nozzle type ID and the recognizing method ID from the mounting machine type data stored in the mounting machine type data storage portion 30 and the mount time data which are managed by the mount time management portion 22, as shown in FIG. 11, for example. When the total working time is compared with the production time DT2 stored in the data input portion 10 and the production time DT2 is smaller than the total working time, the result obtained by dividing the calculated total working time by the production time DT2 is set as the required part mounting machine number. If the division is not perfectly carried out, the result by adding the quotient with 1 is set as the required part mounting machine number. The above processing is carried out on all the combinations of the nozzle type ID and the recognizing method ID stored in the mounting machine type data storage portion 30 to create the mounting machine construction data shown in FIG. 12, for example. The leveling between the mounting machines of the same mounting machine type can be implemented by sharing electrical parts P so that the working time of each part mounting machine is made uniform as much as possible.

Subsequently, the part cassette arrangement management portion 50 settles the arrangement of the part cassette C (step S5). Specifically, the part cassette arrangement management portion 50 arranges the part cassette C on the basis of the mounting machine construction data stored in the mounting machine construction data storage portion 45 so that the time for sucking the electric part P of the part supplier 78 every part mounting machine is reduced.

Subsequently, the output data management portion 60 outputs the data for each form paper or the like (step S6). Specifically, the output data management portion 60 creates and outputs a line construction table on the basis of the mounting machine type (nozzle type, recognizing method) required to construct the mounting line from the mounting machine construction data stored in the mounting machine construction data storage portion 45. Further, the cassette arrangement table is created and output on the basis of the arrangement of the part cassette C required to each part mounting machine from the part cassette arrangement data stored in the part cassette arrangement data storage portion 55. The NC program for the NC device 90 is created and output on the basis of the NC data comprising the mount coordinate data stored in the coordinate data storage portion 12, the part cassette arrangement data stored in the part cassette arrangement data storage portion 55 and the mounting machine construction data stored in the mounting machine construction data storage portion 45.

The NC program thus created is down-loaded to the NC device 90. The cassette C is arranged at a prescribed position of the part mounting machine 70 according to the NC program, each kind of nozzle 81 is mounted to a prescribed nozzle head 80, and the electrical part P is mounted on the wiring board B (step 7).

As described above, according to this embodiment, the mounting machine type, the nozzle type and the recognizing method required to produce the wiring board B can be determined by the mounting machine type management portion 20. The optimum number of mounting machines which can reduce the mounting time can be determined by the working level management portion 40. Further, the arrangement of the optimum part cassette C which can reduce the mounting time can be determined by the part cassette arrangement portion. Accordingly, the NC data created by the mounting machine type management portion 20, the working level management portion 40 and the part cassette arrangement portion 50 can shorten the time required for the mounting work of the electric part P of the part mounting machine 70, and further make uniform the operation rate between the respective part mounting machines constituting the mounting line, thereby enhancing the operation rate of the part mounting machine 70.

Various data input to the NC data creating device 1 are standardized and thus the NC data created are made uniform irrespective of the experience of the creator thereof, thereby enhancing the quality.

In the embodiment, the part mounting machine 70 constructed as shown in FIG. 2 is exemplified. However, the present invention is not limited to this embodiment, and it can support various part mounting machines such as general-purpose ones, special-purpose ones, large-scale ones, compact-size ones.

As described above, according to the present invention, the creating time of the NC data of the part mounting machine can be shortened, and the quality of the NC data can be enhanced, so that the operation rate of the part mounting machine can be enhanced.

What is claimed is:

1. A numerical control data creating method for creating numerical control data to control a part mounting machine for feeding a part and mounting the part onto a board, comprising:

a step of separating part data of the part to be actually mounted from design information of the board, and mount coordinate data indicating a mount position of the part;

a step of creating, on the basis of the part data, nozzle characteristic data indicating the relationship between the part and nozzle type, recognizing method data indicating the relationship between the part and a method for recognizing the part, and mount time data indicating the mount time required for the mounting onto the board every part type;

a step of settling an arrangement of a part cassette allocated every part mounting machine type on the basis of mounting machine construction data to create part cassette arrangement data; and a step of creating numerical control data on the basis of the respective data so that the mount time of the part from the part cassette allocated every part mounting machine onto the board is uniform.

2. The numerical control data creating method as claimed in claim 1, wherein said numerical control data creating step comprises:

a step of temporarily determining the type of the part mounting machine required on the basis of the part data and the mount time data, and creating mounting machine type data;

a step of calculating the total time of a working time every mounting machine type on the basis of the mounting machine type data and the mount time data, adjusting the working time of each mounting machine type within a production time of the board required, and determining the number of part mounting machines to create mounting machine construction data.

\* \* \* \* \*